(12) United States Patent
Kamrani

(10) Patent No.: US 11,303,597 B2
(45) Date of Patent: Apr. 12, 2022

(54) BLOCKCHAIN-BASED COMMUNITY MESSAGING SYSTEM AND METHOD THEREOF

(71) Applicant: Nader Asghari Kamrani, Centreville, VA (US)

(72) Inventor: Nader Asghari Kamrani, Centreville, VA (US)

( * ) Notice: Subject to any disclaimer, the term of this patent is extended or adjusted under 35 U.S.C. 154(b) by 0 days.

(21) Appl. No.: 16/126,506

(22) Filed: Sep. 10, 2018

(65) Prior Publication Data

US 2019/0081918 A1 Mar. 14, 2019

Related U.S. Application Data

(60) Provisional application No. 62/556,285, filed on Sep. 8, 2017.

(51) Int. Cl.
| | |
|---|---|
| *H04L 12/58* | (2006.01) |
| *H04L 51/222* | (2022.01) |
| *H04L 51/00* | (2022.01) |
| *H04L 9/06* | (2006.01) |
| *H04W 4/08* | (2009.01) |
| *H04L 51/046* | (2022.01) |
| *H04L 9/32* | (2006.01) |

(52) U.S. Cl.
CPC ............ *H04L 51/20* (2013.01); *H04L 9/0637* (2013.01); *H04L 9/3239* (2013.01); *H04L 51/046* (2013.01); *H04L 51/12* (2013.01); *H04W 4/08* (2013.01); *H04L 2209/38* (2013.01)

(58) Field of Classification Search
CPC ....... H04L 51/20; H04L 9/0637; H04L 51/12; H04L 51/046; H04W 4/08
USPC .......................................................... 709/206
See application file for complete search history.

(56) References Cited

U.S. PATENT DOCUMENTS

| | | | |
|---|---|---|---|
| 7,729,709 B1 * | 6/2010 | Loeb ....................... | H04L 67/18 |
| | | | 455/456.3 |
| 2002/0120697 A1 * | 8/2002 | Generous .............. | H04L 67/306 |
| | | | 709/206 |

(Continued)

*Primary Examiner* — Philip C Lee
(74) *Attorney, Agent, or Firm* — Farber LLC

(57) ABSTRACT

A system and method for a Community Networking System (CNS). A Community Networking System (CNS) is an online and/or mobile platform for sending messages from Government agencies, Organizations or Businesses (GOB) to people in a community. The CNS includes one or more community hubs that can receive messages related to one or more communities. The CNS is configured to enable registered and/or authorized business users or government users acting as senders to send messages to one or more community hubs. Preferably, a sender electronically communicates with CNS via a CNS website and/or application. The sender selects or chooses one or more intended community hubs that the sender desires to send a message to and provides the message. The sender further requests CNS (for example by clicking on "send" button) to send the message to the one or more intended community hubs. The CNS receives the request and/or the message and calculates the intended recipients of the one or more intended communities. The CNS further electronically notifies the intended recipients and/or electronically delivers the message to the intended recipients.

26 Claims, 13 Drawing Sheets

(56) References Cited

U.S. PATENT DOCUMENTS

| | | | |
|---|---|---|---|
| 2003/0105826 A1* | 6/2003 | Mayraz | G06F 16/9535 709/206 |
| 2011/0045761 A1* | 2/2011 | Rolf | H04L 67/26 455/3.06 |
| 2011/0106891 A1* | 5/2011 | Gallant | H04L 12/1854 709/206 |
| 2012/0059906 A1* | 3/2012 | Ciancio-Bunch | G06F 16/245 709/217 |
| 2015/0120844 A1 | 4/2015 | Adler et al. | |
| 2015/0264143 A1* | 9/2015 | Wiesen | G06Q 50/01 370/312 |
| 2017/0359288 A1* | 12/2017 | Golan | G06F 16/2379 |
| 2018/0027068 A1* | 1/2018 | Kumar | H04L 67/1044 709/206 |
| 2018/0069906 A1* | 3/2018 | Yang | H04L 65/1069 |
| 2018/0176174 A1* | 6/2018 | Sherman | H04L 45/302 |

* cited by examiner

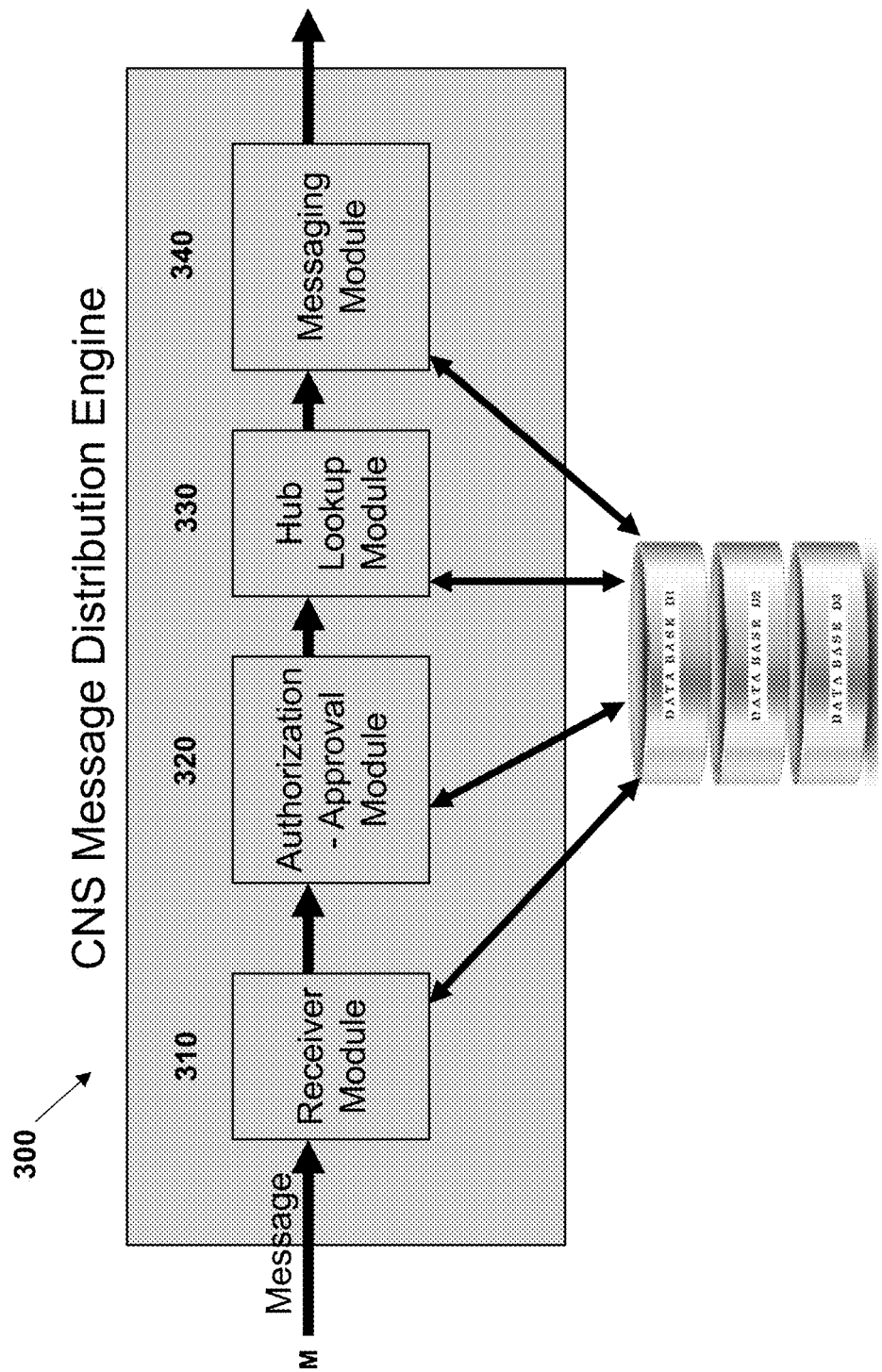

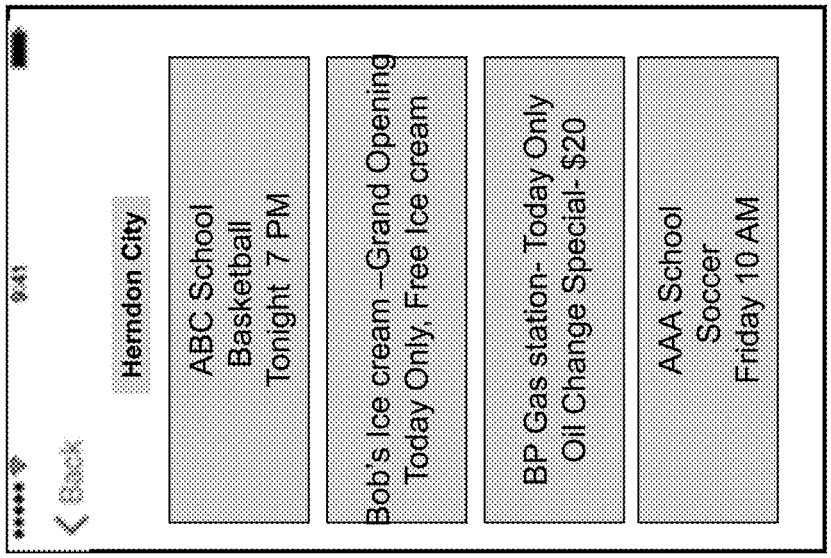

- Smith can sign-up for free and join the "HerndonCity-Hub".

- After joining the hub, Smith can immediately see his "Herndon" page updated with messages from businesses in Herndon City.

- Smith didn't know that his local high school has a basketball game tonight, or that a new ice cream shop in his neighborhood offers free ice cream.

- The little messages from CNS painted a picture of events that Smith would never have seen before.

Fig. 5A

BLOCKCHAIN-BASED COMMUNITY MESSAGING SYSTEM AND METHOD THEREOF

CROSS-REFERENCE TO RELATED APPLICATIONS

The present Application for Patent claims the benefit of Provisional Application Ser. No. 62/556,285 entitled "COMMUNITY NETWORKING SYSTEM AND METHODS" filed on Sep. 8, 2017, the disclosures of which are hereby expressly incorporated by reference in its entirety.

FIELD OF ART

The present disclosure generally relates to electronic communication of a sender to one or more community hubs. The disclosure more specifically relates to online and/or mobile community networking for connecting Government agencies, organizations and businesses to communities through community hubs for communication of messages.

BACKGROUND OF THE DISCLOSURE

Currently, Government agencies, Organizations, and Businesses (GOBs) are not well connected with communities. For questions such as "How to reach people in a community in an emergency? Or how to inform people in a community in an emergency?" most GOBs are not readily prepared to handle these issues. Often, communications from the GOBs to communities are limited to e-mail, phone call, radio, newspaper, TV or social networking sites and are inefficient.

In many cases, GOBs request people to follow them on social networking sites to receive messages. However, it would be difficult for an average online user to register and follow hundreds (or thousands) of GOBs' social networking sites to receive messages from all of them. Also, because of lack of resources and lack of communication between GOBs and people in a community, most people are not aware what is happening in their community. For example, most people living in a city are often unaware when there is an emergency alert in their community.

In some systems, messaging is limited only to people who are connected as friends or followers of the GOBs. Therefore, GOBs are inefficient in communication with such community without having friend- or follower-connections.

In other cases, users are limited to receiving messages merely corresponding to their current location or address. Thus, it appears that the users are not given an option to receive messages as to what is currently happening in another city or country if they choose so. Thus, it is needed to establish a system and method that connects authorized GOB senders with recipients belonging to one or more community hubs and allows effective messaging from GOBs to intended recipients.

What is needed is efficient and real-time community-centric messaging system and method.

What is needed is a system and method that enables people to receive messages from businesses, organizations and government agencies related to the news and activities in one or more selected community.

What is needed is a system and method that allows users to register once, join one or more communities, and receive messages from all GOBs in relation to the communities.

What is needed is a system and method that allows users to join communities that the user is interested in (and may be different from the community that the user lives and/or works).

What is needed is a system and method that allows employees of a company to join one or more communities within a company, such a department, and receive messages related to the communities within the company in real-time.

SUMMARY

According to one embodiment of the present disclosure, a blockchain-based community messaging system that includes a processor and a memory is provided. The blockchain-based community messaging system may include a distributed blockchain computer system including multiple computing nodes, each of the multiple computing nodes storing electronic messages or a portion of electronic messages, wherein one community-hub is in hierarchical relationship with another community-hub, and wherein the distributed blockchain computer system is configured to perform operations, the operations may include receiving the electronic messages via a network, wherein the electronic messages are received along with the one or more community-hub indicators indicating a respective community-hub for the electronic messages; storing the electronic messages or the portion of the electronic messages with the one or more community-hub indicators; in an electronic communication with a recipient of the one or more community-hubs, identifying the recipient; identifying the one or more community-hubs of the recipient, wherein the recipient is a user who subscribed to, or joined the one or more community-hubs to receive the electronic messages of the one or more community-hubs; and providing the electronic messages of the one or more community-hubs to the recipient.

The distributed blockchain computer system may provide the electronic messages to the recipient in response to a request received.

The one or more community-hubs represent a physical community, and the physical community includes information of zip code, city, county, state, country, company, or a department of a company.

The blockchain-based community messaging system further performs determining whether any of the one or more community-hubs of the recipient has a parent-community-hub, and when any of the one or more community-hubs of the recipient has the parent-community-hub, providing the electronic messages of the parent-community-hub to the recipient.

The electronic messages are displayed on a recipient computing device, a recipient smart device or a recipient mobile phone.

According to another embodiment of the present disclosure, a community messaging system that includes a processor and a memory is provided. The community messaging system may include a plurality of community-hubs, wherein a community-hub represents a physical community or place, the community-hub has multiple senders who are authorized to send electronic messages, the community-hub has recipients who subscribe or join the community-hub to receive the electronic messages, the community-hub is in hierarchical relationship with one or more other community-hubs, and wherein when the community messaging system receives the electronic messages for the community-hub and the community-hub has a sub-community-hub, the electronic messages are provided to the recipients of the community-hub and to recipients of the sub-community-hub, in an electronic communication with the recipients, identifying the recipients, identifying the one or more community-hubs of the recipients, and providing the electronic messages of the one or more community-hubs to the recipients, wherein the electronic messages are provided by one or more authorized senders to the one or more community-hubs.

The community messaging system of claim further includes determining whether any of the one or more community-hubs has a parent-community-hub, and when any of the one or more community-hubs of the recipient has the parent-community-hub, providing electronic messages of the parent-community-hub to the recipients.

The community messaging system provides the electronic messages to each of the recipients who is identified in response to a request received.

The one or more authorized senders and the recipient are members of the one or more community-hubs.

The community messaging system further includes a distributed blockchain computer system including multiple computing nodes, each computing nodes storing the electronic messages or a portion of the electronic messages of the one or more community-hubs, and retrieving the electronic messages or portion of the electronic messages of the one or more community-hubs from the distributed blockchain computer system.

According to the other embodiment of the present disclosure, a community messaging system that includes a processor and a memory is provided. The community messaging system includes a plurality of community-hubs, wherein each of the plurality of community-hubs represents a physical community or place, each of the plurality of community-hubs has multiple senders who are authorized to send electronic messages, each of the plurality of community-hubs has multiple recipients who subscribe or join the each of the plurality of community-hubs to receive the electronic messages, and one of the plurality of the community-hubs is in hierarchical relationship with another of the plurality of the community-hubs, wherein when the community messaging system receives the electronic messages for the plurality of community-hubs, and each of the plurality of community-hubs has a sub-community-hub, the electronic messages are provided to the recipients of the plurality of community-hubs and to recipients of the sub-community-hub, and wherein the community messaging system receives the electronic messages from one of the multiple senders, identifies the plurality of community-hubs of the electronic messages, identifies the recipients of the plurality of community-hubs, and provides the electronic messages to the recipients who are identified.

The community messaging system further includes determining whether any of the plurality of community-hubs has a sub-community-hub, and when any of the plurality of community-hubs has a sub-community-hub, providing the electronic messages to the recipients of the sub-community-hub.

The community messaging system further includes a distributed blockchain computer system including multiple computing nodes, each computing nodes storing the electronic messages or a portion of the electronic messages of the plurality of community-hubs, storing the electronic messages or the portion of the electronic messages in the distributed blockchain computer system, and retrieving the electronic messages or portion of the electronic messages from the distributed blockchain computer system.

According to the other embodiment of the present disclosure, a method to enhance electronic messaging within a system having a plurality of community-hubs is provided. The method includes receiving an electronic message from an authorized sender for one or more respective community-hubs, the community-hub representing a physical community or place, the one or more community-hubs having multiple senders who are authorized to send the electronic message, and the one or more community-hubs having multiple recipients who subscribe or join the one or more community-hubs to receive the electronic message, wherein one of the one or more the community-hubs is in hierarchical relationship with another of the one or more community-hubs, and wherein when the electronic message is received for the one or more community-hubs and the one or more community-hubs have a sub-community-hub, the electronic message is provided to the multiple recipients of the one or more community-hubs and to recipients of the sub-community-hub, identifying the multiple recipients of the one or more respective community-hubs, and providing the electronic message to the multiple recipients of the one or more community-hubs who are identified.

The method further includes retrieving the electronic message or a portion of the electronic message from a distributed blockchain computer system, wherein the distributed blockchain computer system includes multiple computing nodes, each computing nodes storing the electronic message or the portion of the electronic message of the one or more community-hubs.

BRIEF DESCRIPTION OF THE DRAWINGS

FIG. 3 shows a block diagram of the Community Networking System (CNS)
Message Distribution Engine.

FIG. 5A-5D show various exemplary implementations of messaging via CNS.

DETAILED DESCRIPTION

Figure 1:
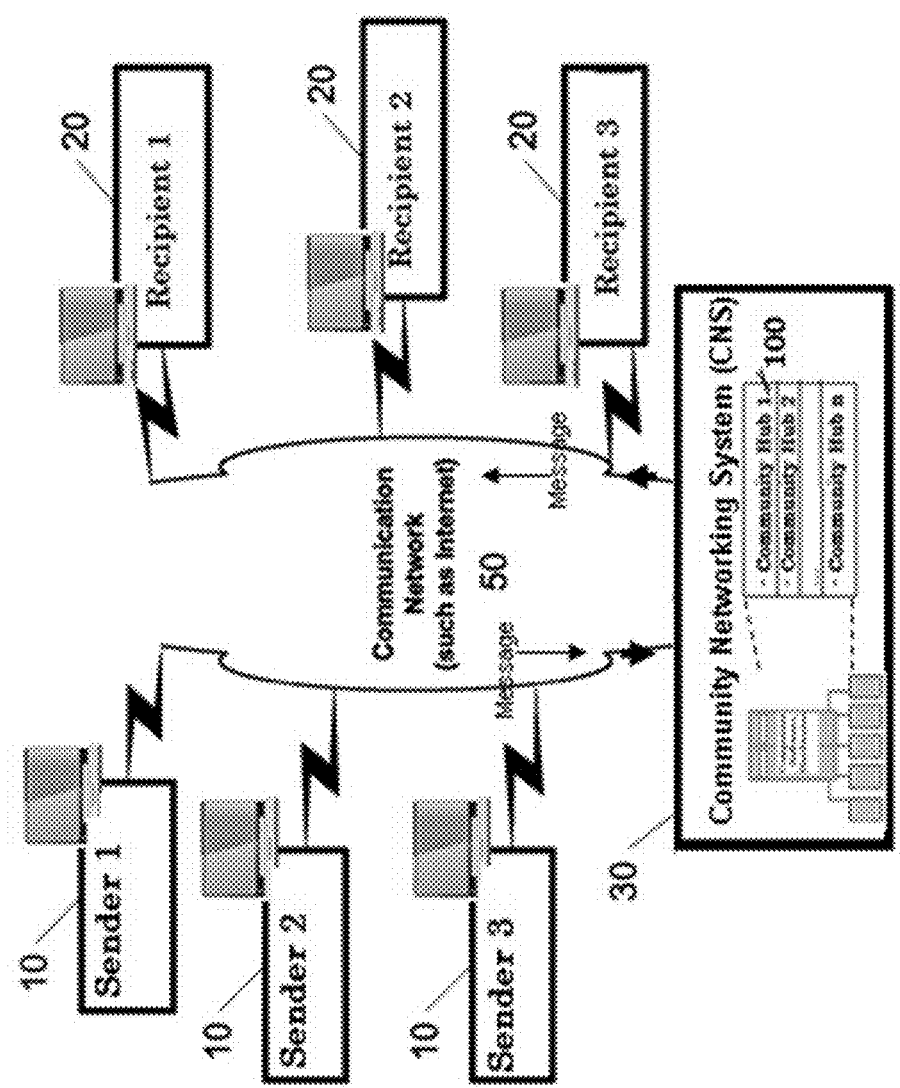
FIG. 1 shows a Community Networking System (CNS) according to one embodiment of the present disclosure.

Reference will now be made in detail to the several embodiments, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like, may be used to describe various elements, but do not limit such elements. Such terms are only used to distinguish one element from another.

The term "unit" or "module" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function. In addition, it is understood that "a" or "an" refers to one or more.

A Community Networking System (CNS) has a processor and a memory and is provided for directing electronic messages from registered Government agencies, Organizations or Businesses (GOBs) to one or more community hubs. Each of one or more community hubs comprises multiple members and may be in a parent-, child-, grandchild-hierarchical relationship maintained by the CNS. A computer associated with the CNS calculates intended recipients subscribed to community hubs indicated by the sender and sends the electronic messages to the respective intended recipients.

The electronic messages may include one or more multimedia or digital contents such as text, image, digital photo, digital video, digital audio and digital files.

GOBs may need to be registered with the CNS and authorized for sending messages to the one or more community hubs. The CNS may prevent GOBs from sending electronic messages to community hubs without pre-authorization.

For messaging via the CNS, GOBs do not necessarily need recipients' information such as contact information. By joining one or more community hubs, the registered recipient provides their information to the CNS authorizes the CNS (or the one or more community hubs) to send electronic messages to the recipient(s). Furthermore, the location of the recipient need not play a major role in joining a community hub. For example, a recipient living in Virginia may join the "NewYorkCity-Hub" to receive current messages related to New York City. Thus, the recipient of the CNS may have freedom of choice to join a community hub as a member and to discontinue membership at any time. By discontinuing membership, the recipient will no longer receive messages from that community hub. In some cases (such as a company-hub within a company), the recipients' freedom of choice may be limited because employees of a company may be added by another employee of the company or they may need the company's authorization for joining the hub. For example, a client may need the company's authorization for joining the company's hub.

The Community Networking System and Method removes the "no-connection, no-communication" barrier. The CNS connects GOB s with respective intended recipients in one or more communities. It enables GOBs to effectively communicate messages with people in a community or in relation to a community. The CNS further enables people to receive electronic messages, news and information in real time from thousands of businesses within a community or in relation to a community.

For convenience, the term "sender" is used throughout to represent a user sending a message via CNS.

The term "recipient" is used to represent a user who receives a message via CNS.

As used herein, a "community hub" electronically represents a physical community or populated place in which people live and/or work and interact. The community hubs are interconnected in a hierarchical fashion and are mapped and maintained by the CNS. Some Community hubs may have a plurality of sub-community-hubs, such as children or grandchildren. Community hub examples include: a company, a department of a company, a zip code, a city, a county, a state and/or a country. A community hub has multiple users (members) as senders and/or recipients.

The term "member" of a community hub is used to represent a registered user that joins that community hub.

Generally speaking, the Community Networking System (CNS) comprises: 1) a plurality of community hubs, 2) a plurality of senders, and 3) a plurality of recipients.

1. A plurality of community hubs: A community hub electronically represents a physical community or place in which people live and/or work. Examples of a physical community are: a city, a county, a state, a country, a company, a department or a project within a company. A community hub has multiple users (members) as senders and/or recipients.

Community hubs may be in a hierarchical parent-child relationship with other community hubs. For example, a state hub that has many city hubs can act as a parent hub of those city hubs. Children hubs with the same parent would be considered sibling hubs. A message sent to a parent community hub may cause the CNS to send the message not only to the member recipients of the parent community hub but also to all member recipients of its children hubs. For example, assume "FairfaxCounty-hub" is a child of "Virginia-hub". A message sent to "Virginia-hub" may be sent downstream to all recipients of "Virginia-hub" and to all recipients of "FairfaxCounty-hub". However, a message sent to a child community hub will not be sent upstream by the CNS to the recipients of the parent community hub. In other words, a message sent to "FairfaxCounty-hub" will not be sent to all recipients of "Virginia-hub".

2. A plurality of senders: a sender represents an authorized user sending an electronic message via a designated CNS computer to one or more community-hubs. A GOB user may first register at the Community Networking System (CNS) as a sender and join one or more community hubs for messaging. The sender may also need to request and receive authorization from the system for messaging to certain community hubs. A sender who is authorized to send messages to a community hub is said to be a "sender member" of the community hub. The CNS may only allow a sender member of a community hub to send messages. A sender who is not a member of a community hub and also not a member of a parent of the community hub, may be prohibited from sending messages to the community hub. For example, assuming Joe is a sender member of community hub "hub-A" and "hub-A" is a parent of community hub "hub-B", the CNS may allow Joe to send messages to "hub-A" and "hub-B". However, Joe is not allowed to send messages to community hub "hub-C" because Joe is not a sender member of the community hub "hub-C". A sender may be simultaneously a sender member of multiple community-hubs for messaging. For example, if Joe is a manager of three different projects ("project-A", "project-B" and "project-C") in his company, Joe can simultaneously act as a sender member of "project-A-hub", "project-B-hub" and "project-C-hub". Also the CNS and/or the sender may allow or prevent the intended recipients to reply to the message. The CNS and/or the sender may not allow the reply to be visible to all intended recipients. A user who acts as a sender member of a community hub, may also act as a recipient member of the community hub to receive messages.

3. A plurality of recipients: A recipient represents a user who receives a message via a designated CNS computer. A user may register with the CNS as a recipient and become a member of one or more community hubs in order to receive messages from those community hubs. A recipient who joins a community hub to receive messages is said to be a recipient member of the community hub. A recipient may be simultaneously a member of a community hub that is different from the community that the recipients lives and/or works in. For example, assuming that Joe is living in Atlanta city, Joe may simultaneously be a recipient member of the communities "FloridaState-hub", "VirginiaBeach-hub" as well as the "AtlantaCity-hub".

A recipient member of a child community hub may not only receive messages from the child community hub, but also the recipient may also receive messages from the parent community hub. For example, the community hub "Virginia-hub" may be a parent community of "FairfaxCity-hub". In this example when Joe joins the "FairfaxCity-hub" as recipient, Joe may not only receive messages from "FairfaxCity-hub", but also Joe may receive messages from "Virginia-hub".

For security purposes, the CNS may not allow a recipient member of a community hub to send messages to the community hub. For example, the CNS may not allow citizen Joe to send an emergency message to the "FairfaxCity-hub". Only an authorized sender member of a community hub such as government user can send an emergency alert message to a community hub. However, the CNS may allow recipient members to respond to the message and/or participate with other recipient members in discussions about the emergency message.

Advantageously, the CNS may not require a sender member to have the contact information of intended recipients in order to send a message. For example, a local high school located in Fairfax city, would like to invite people of Fairfax city for a school concert. The local high school (who is for example a sender member of the community hub "FairfaxCity-hub") can create a message containing information regarding the school concert and send the message to the "FairfaxCity-hub". After the CNS receives the message that was sent to "FairfaxCity-hub", the system will calculate the intended recipients of the "FairfaxCity-hub" that may include recipient members of "FairfaxCity-hub"—as well as recipient members of all its children hubs—and send the message to the intended recipients. For messaging through the CNS, the local high school above may not need to have or to use the contact information of people for messaging since they are members of the "FairfaxCity-hub" community.

The CNS may also give sender members an option to choose between one-way or two-way messaging. If a sender member selects or chooses one-way messaging, the CNS may prevent recipient members from replying to the sender and/or participating in discussion about the message. If a sender member indicates, selects and chooses a two-way messaging, the CNS may allow recipient members to reply to the sender and/or other participants.

A "non-member recipient" is excluded from receiving messages from a community hub, unless the recipient is already a member of one of the children of the community hub. One community hub might be in a hierarchical parent-child relationship with another community hub. For example, "USA-hub" is a parent of "Virginia-hub" or "Virginia-hub" is a child of "USA-hub". If a recipient is a member of a child community hub, then the recipient may be automatically a member of the parent community hub. For example, assuming Joe is a member of "Virginia-hub", Joe will not only receive messages from the "Virginia-hub", he may also receive messages sent to the "USA-hub" because Joe may be automatically a member of "USA-hub".

To deliver a message to intended recipients, a CNS server is configured to determine intended recipient information such as recipient member device information and/or member recipient account or contact information. The CNS server may also be configured to electronically send messages to the intended recipients via a communication network or one of multiple electronic delivery options such as Social Networking site(s), Web, Application Program Interface (API), Short Message Service (SMS), Multimedia Message Service (MMS), Email, Instant Messaging (IM) and/or Mobile Applications (applications running on recipients' smart phone and/or smart devices).

The CNS server may also be configured to determine intended recipient information based on sender member permissions. For example, if the sender member only has permission to send messages to county A hub, only members of that county hub (or members of children hubs of county A hub) will be considered as intended recipients.

The CNS may further be configured to determine intended recipient information based on recipient member preferences. Upon registration, a recipient member may request membership for certain community hubs, indicate a preferred method for receiving messages (email, text, social media, etc.), indicate certain areas of interest (e.g., news, entertainment) and so forth.

The CNS continually builds connections between GOBs and people through community hubs. The community hub's connection to people is either direct, or indirect—via one or more levels of children community hubs.

The CNS provides mechanisms for sender members to send messages to one or more community hubs and to distribute messages to intended recipient members of the community hubs. Messages for example may be news, events, sales information, requests for donations, alerts and/or warnings within a community, among other things. The CNS may also be used across various types of computerized systems and platforms.

In one embodiment, the implementation described includes a server that interfaces with sender members and recipient members through a web-site or application (App) on a client computing device. However, other implementations are possible. Such example includes one or more servers that communicate with clients using various client and server applications (e.g., non-web-based applications) or one or more external servers that communicate electronic messages with the CNS system.

Alternatively, the CNS may not require a centralized server but be implemented as a peer-to-peer system. In this case, peer-to-peer applications running on client devices that allow sender members to send messages to recipient members through community hubs and perform other functions. For example, a peer-to-peer network of smart phones can communicate via Short Message Service (SMS) over a cellular network. Further, other variations of a CNS described herein can be adapted.

FIG. 1 illustrates a Community Networking System (CNS) computer 30 according to one embodiment of the present disclosure. CNS computer 30 provides a mechanism for sender member 10 to send messages to one or more indicated community hubs 100. CNS computer 30 calculates the intended recipient member 20 of the indicated community hubs 100 and sends messages to the intended recipient member 20. Sender member 10 can send messages to one or more community hubs 100 to inform associated recipient member 20 about news, sales, alerts, sports, games and/or interesting events related to that community. Community hub 100 electronically represents a specific physical community of GOBs and/or recipients within a city, a county, a state, a country, a company, a department and/or a project within a company.

As illustrated in FIG. 1, the Community Networking System (CNS) computer 30 maintains a plurality of community hubs 100 with which sender member 10 or recipient member 20 may interact. Each community hub 100 includes multiple members.

CNS computer 30 may also be configured to electronically send messages M to the intended recipient member 20 via a communication network 50 using multiple electronic delivery options such as Social Network(s), Web, Application Program Interface (API), Short Message Service (SMS), Multimedia Message Service (MMS), Email, Instant Messaging (IM) and/or Mobile Applications (applications running on recipients' smart phone and/or smart devices).

The Community Networking System (CNS) computer 30 may maintain a member profile stored in one or more associated database Dn for each sender member 10 and recipient member 20 of CNS computer 30.

When sender member 10 registers with CNS computer 30, sender member 10 is assigned an authorization indicator $I_A$ associated with certain hierarchical permission levels for messaging as part of its member profile. The authorization indicator $I_A$ may be provided by sender member 10 or stored in a database Dn associated with CNS computer 30 and accessed when sender member 10 sends a message M. For example, a business may be assigned an authorization indicator $I_A$ that allows it to send messages M to cities within a certain county, but may not allow the business to send messages M to other states or counties.

When recipient member 20 registers with CNS computer 30, recipient member 20 provides contact information and/or contact preferences (e.g., email, text, and social media) as part of their profile. Recipient member 20 may also indicate certain message preferences as part of their member profile. For example, recipient member 20 may indicate that recipient member 20 only desires messages M pertaining to news and weather, but not sports or entertainment.

When sender member 10 sends a message M, sender member 10 provides one or more community hub indicators $I_C$ to CNS computer 30 specifying the communities and/or sub-communities to which the message M is directed. In one embodiment of the present disclosure, sender member 10 may indicate selected community hubs from a list of presented on a user interface. CNS computer 30 may use the community hub indicators $I_C$ to calculate the intended recipient member 20 further based on the community hub hierarchical structure and user preferences.

In one embodiment of the present disclosure, CNS computer 30 or sender member 10 may indicate a message response indicator $I_R$. The message response indicator $I_R$ of the message M may indicate whether the message M is one-way (no response from recipient member 20 allowed) or two-way—allowing recipient member 20 to respond to the message M and/or discuss it with other recipient member 20. In some cases, sender member 10 may indicate with response indicator $I_R$ that recipient member 20 may respond to the message M, but are not allowed to discuss the message M with other recipient member 20. In other cases, sender member 10 may indicate that recipient member 20 may discuss the message M with other members, but not respond to sender member 10. In yet other cases, sender member 10 may indicate that recipient member 20 may see other member responses, but not discuss the message M. For example, sender member 10 may indicate that responses to message M from one intended recipient member 20 would not be visible to another recipient member 20 and only be visible to sender member 10. In one embodiment of the present disclosure, such settings may be executed by sender member 10 and/or CNS computer 30.

Any action or messages M sent by sender member 10 to community hub 100 and from community hub 100 to recipient member 20 may be maintained and tracked in a message log stored in one or more database $D_n$ or other data repository. The tracked actions may include: adding community hub 100 connection, sending a message M to a community hub 100, receiving a message M from community hub 100 by recipient member 20, attending an event posted by sender member 10, among others.

Figure 2:
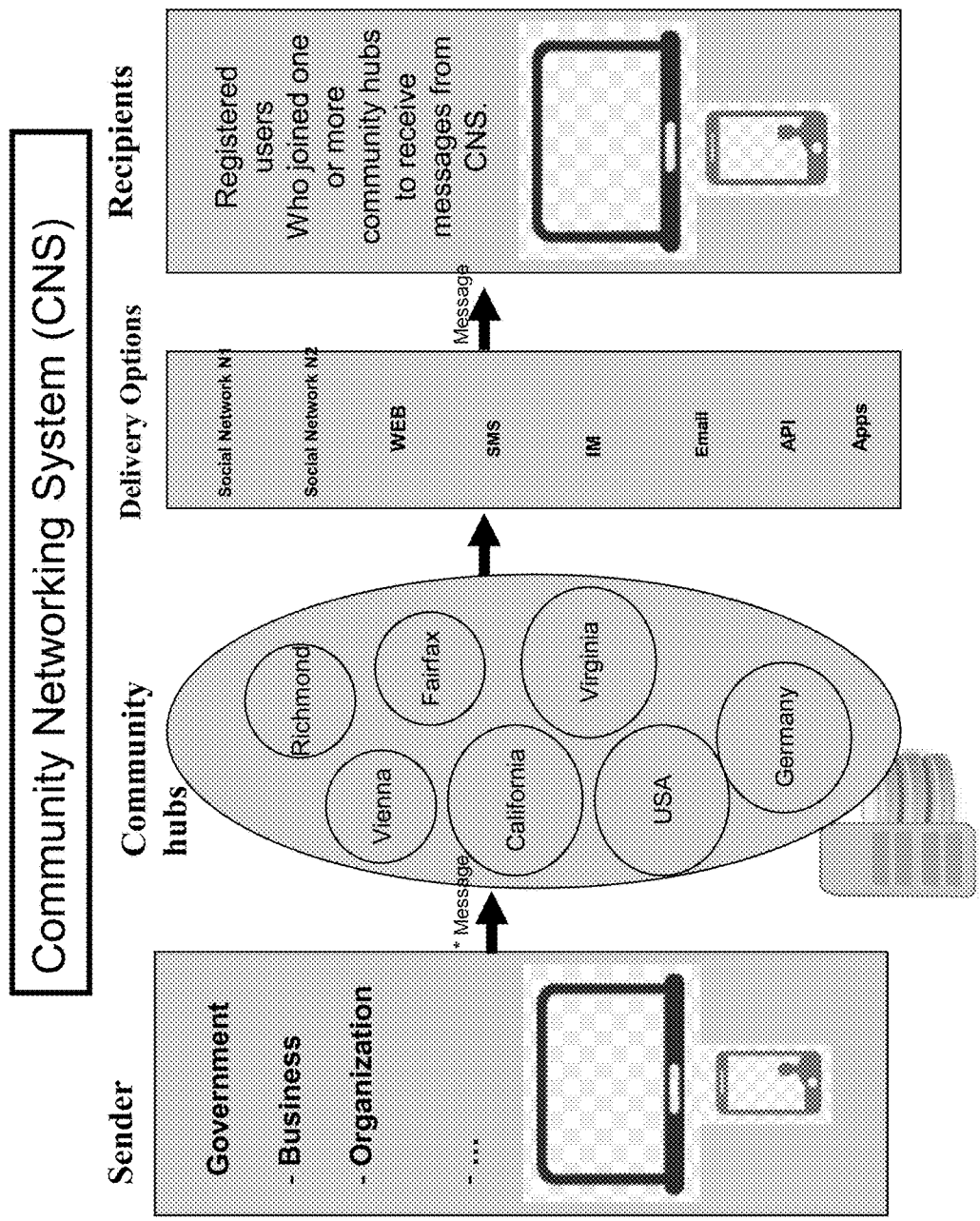
FIG. 2 shows a high-level block diagram illustrating message flow from sender member to community hubs and from community hubs to the recipient members.

FIGS. 1 and 2 are high-level block diagram illustrating message M flow from sender member or sender computer 10 to community hubs 100 and from community hubs 100 to recipient member or recipient device 20. Sender member 10 and recipient member 20 devices comprise one or more computing devices that can receive user input and/or can transmit and receive data via the communication network 50. For example, sender member 10 or recipient member 20 may be external computer or servers, desktop computers, laptop computers, smart devices, smart phones, personal digital assistants (PDAs), or any other device including computing functionality and data communication capabilities. Sender member 10 and recipient member 20 are configured to communicate with CNS computer 30 via communication network 50, which may comprise public or private networks, any combination of local area and/or wide area networks, using both wired and wireless communication systems. The member (sender member 10 and/or recipient member 20) devices may be running a web browser or mobile applications that allow users to view website and information served by CNS computer 30. The members of the community networking system computer 30 are sender member 10 and/or recipient member 20. In one embodiment of the present disclosure, it is appreciated that a user who joins community hub 100 as sender member 10 may also be registered as recipient member 20 of the community hub 100, but not necessarily vice versa. Other applications similar to web browsers may also be run on the member device to create and/or transmit a message or view message content.

FIG. 3 is a high-level diagram illustrating a CNS Message Distribution Engine 300 with multiple functional computer modules. According to one embodiment of the present disclosure, the CNS message distribution engine 300 comprises: a receiver module 310 that receives messages M from sender member 10, an authorization approval module 320 that determines if sender member 10 is authorized to send the message, a hub lookup module 330 that looks up the indicated community hub(s), determines whether the indicated community hub(s) have any children hubs and calculates the intended recipient member 20 based on indicated community hub(s) and any children hubs of the indicated community hub(s), and messaging module 340 that sends the message to the intended recipient member 20. For example, when an electric message is sent to a state hub such as "Virginia-hub", the CNS computer 30 determines whether "Virginia-hub" has any children hub such as "Fairfax County-hub" etc. The CNS then calculates the intended recipients of the "Virginia-hub" as well as the intended recipients of the "FairfaxCounty-Hub).

According to one aspect of one embodiment of the present disclosure, a computer-implemented method for use within a Community Network System is disclosed. The Community Network System (CNS) includes at least one computer in electronic communication with a plurality of community hubs. The method comprising: (1) using the computer, receiving an electronic message along with one or more community hub indicators indicating the selected community hubs the message is to be disseminated to; (2) using the computer, determining if any of the selected community hubs have any children community hubs; (3) using the computer, calculating intended recipient members for the message based at least on the one or more community hub indicators, children hub indicators (if any) and/or a hierarchical relationship between the community hubs; and (4) using the computer, sending the message to the intended recipients.

Any of the steps, operations, or processes described herein may be implemented or performed with one or more computers and/or hardware devices, one or more hardware or software programs, alone or in combination with other devices. In one embodiment of the present disclosure, a software module is implemented with a computer program product comprising a non-transitory computer-readable medium containing computer program code, which can be executed by a computer processor for performing any or all of the steps, operations, or processes described.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system. Furthermore, any computing systems referred to in the specification may include a single processor or may be architectures employing multiple processor designs for increased computing capability.

Figure 4A:
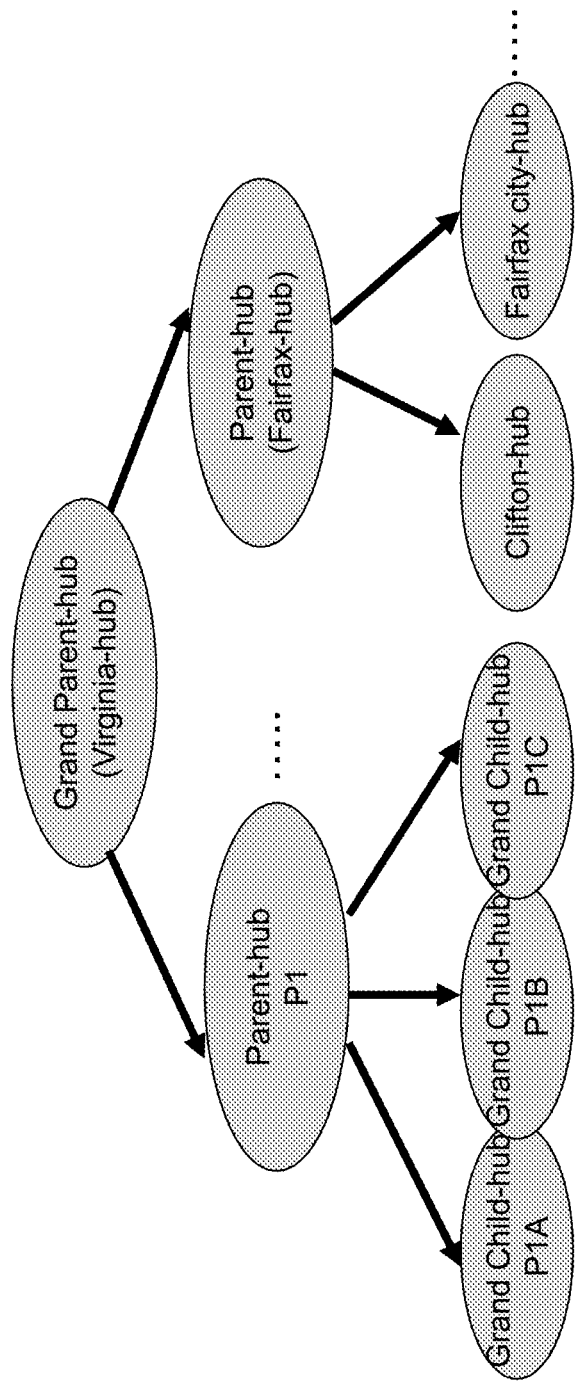
FIGS. 4A and 4B show hierarchical relationships between different community hubs.

FIG. 4A illustrates how a community hub may have multiple children and grand-children hubs. Any message sent to a parent hub may be distributed to all its children hubs. For example, a message sent to a State hub such as "Virginia-hub" may be distributed to all county- and city-hubs within Virginia.

Figure 4B:
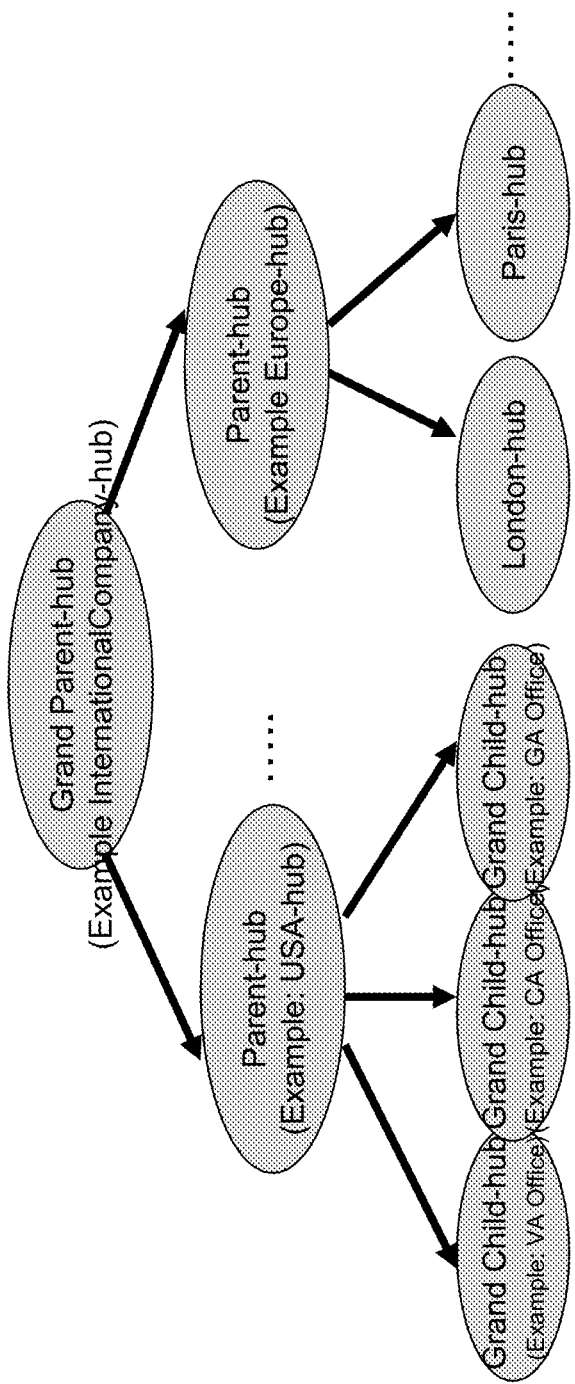

FIG. 4B illustrates another example where a company has multiple offices in the USA (Va., Calif., and Ga.) and Europe. The company can send messages to all employees in the USA by sending the messages to the "USA-hub". The CNS computer 30 will send the message to all offices of the company within the USA. A message addressed to a Parent hub may be distributed to all its children-hubs.

Figure 4C:
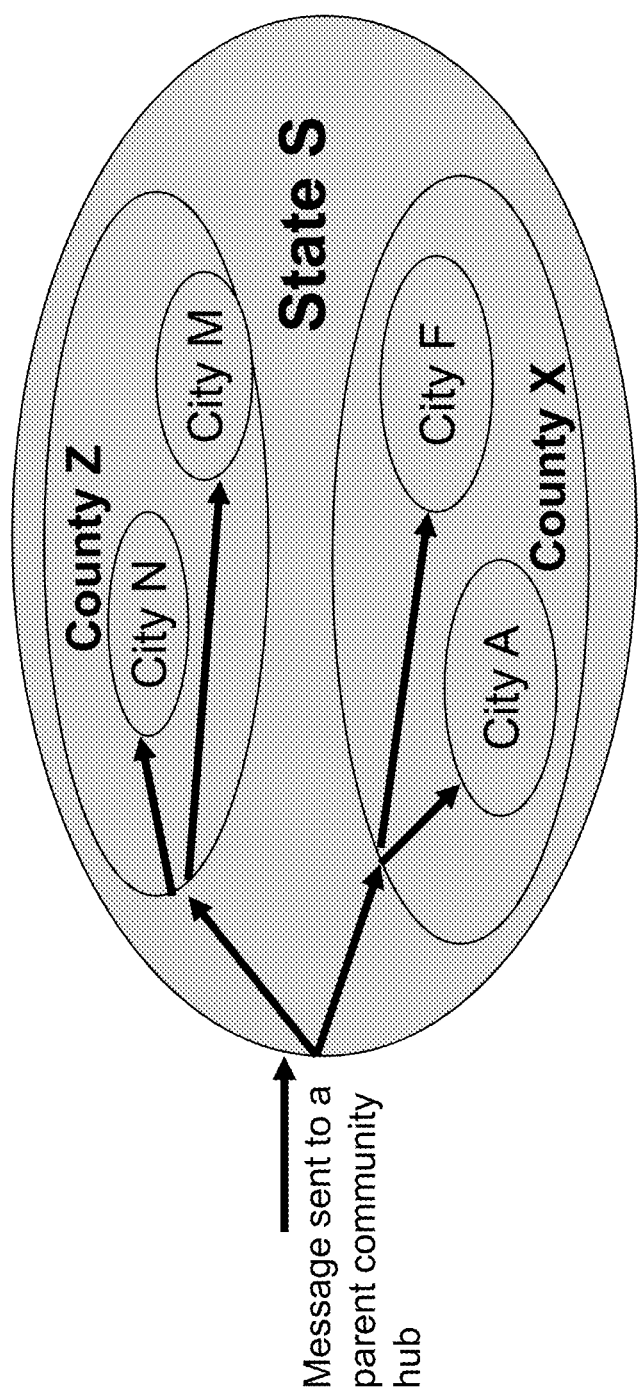
FIG. 4C shows message distribution from parent hubs to children hubs.

FIG. 4C provides another illustration of message distribution from parent hubs to children hubs. In this example, the parent hub may, or may not, be configured to automatically distribute messages to children hubs. As shown in the figure, "State S" is the parent hub of "County X" and "County Z". "County X" is also the parent hub of "City A" and "City F". A message sent to the parent hub "State S" may be configured to be distributed to certain children or grandchildren e.g., according to different sender member permissions and/or recipient member preferences.

FIG. 5A illustrates recipient member 20 joining the "HerndonCity-Hub" via a website, application or mobile App that interfaces with the CNS computer 30. After joining the hub, recipient member 20 device displays messages e.g., from businesses in Herndon city.

Figure 5B:
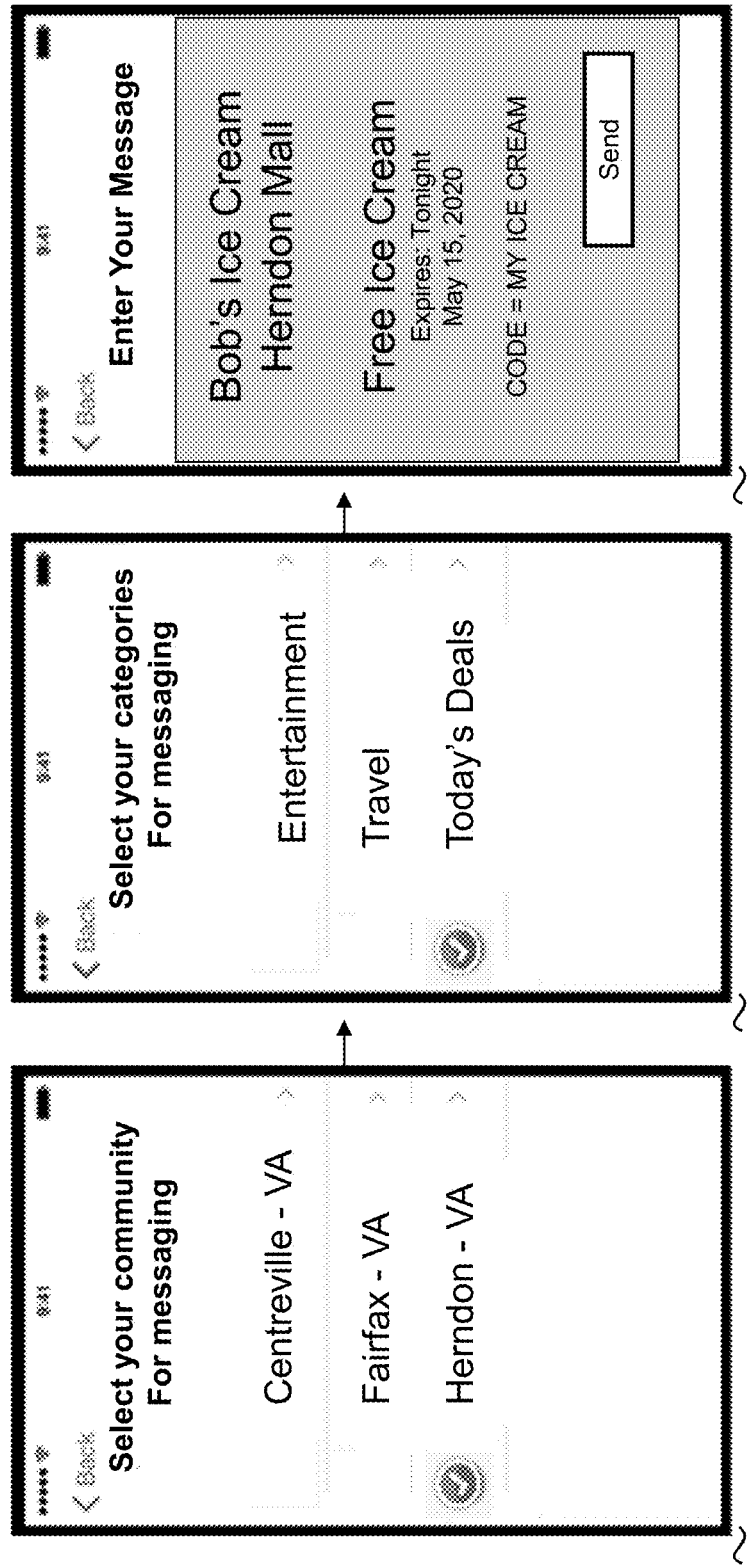

FIG. 5B shows how a business can message customers in an entire community. Sender member 10 (in this case an ice cream shop) selects a community to message via a website or App that interfaces with the CNS computer 30. Once the community is selected, other options/preferences may be selected (e.g., Today's Deals). The message is created and submitted to the CNS computer 30 for distribution to intended recipient member 20.

Figure 5C:
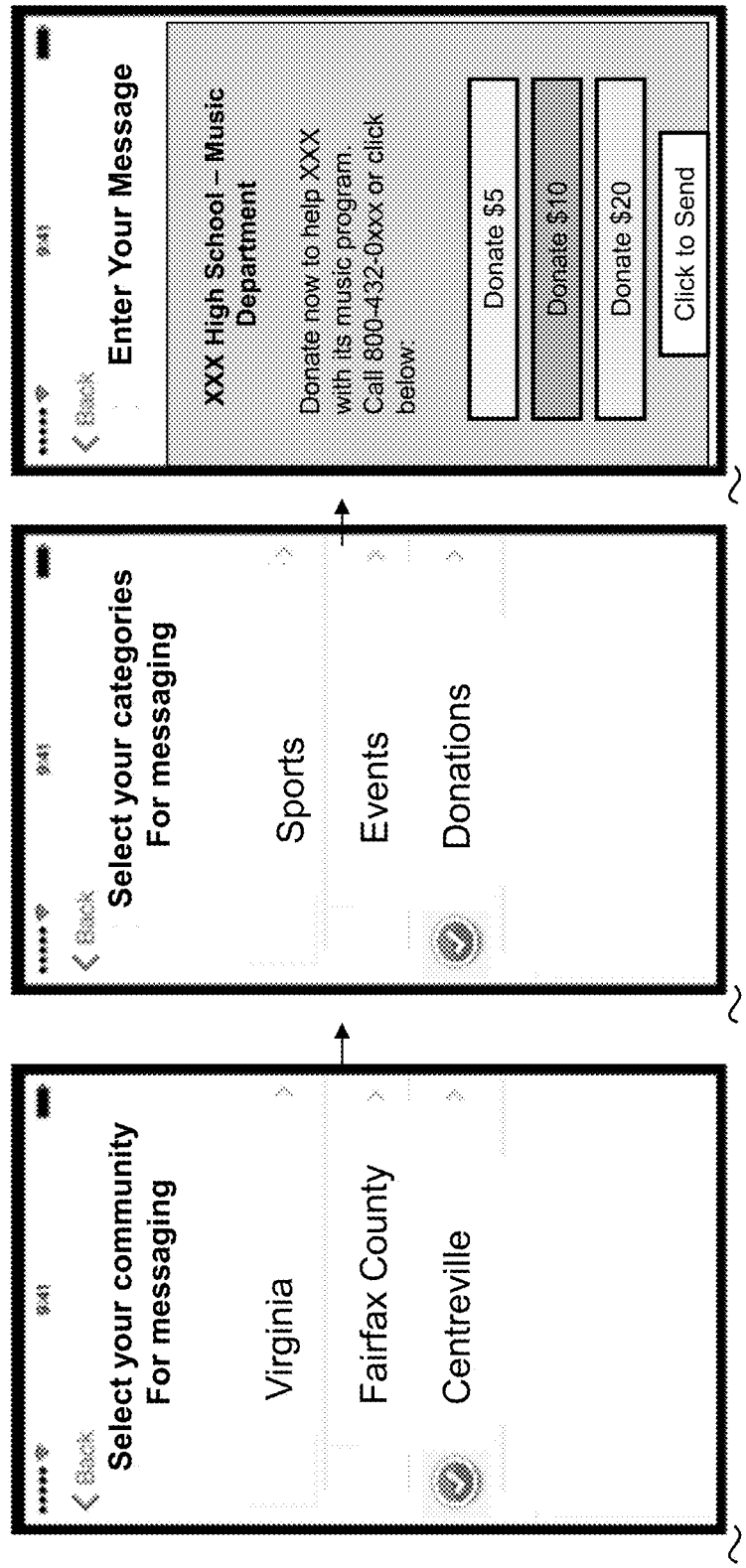

FIG. 5C provides another illustration of how a local high school can request donations from members in its community. Sender member 10 (in this case a school) selects a community to message via a website or App that interfaces with the CNS computer 30. A message category is further selected along with a message. The message may further include donate options for recipient member 20 to respond (two-way messaging). The message is submitted to the CNS for distribution to intended recipient member 20.

Figure 5D:
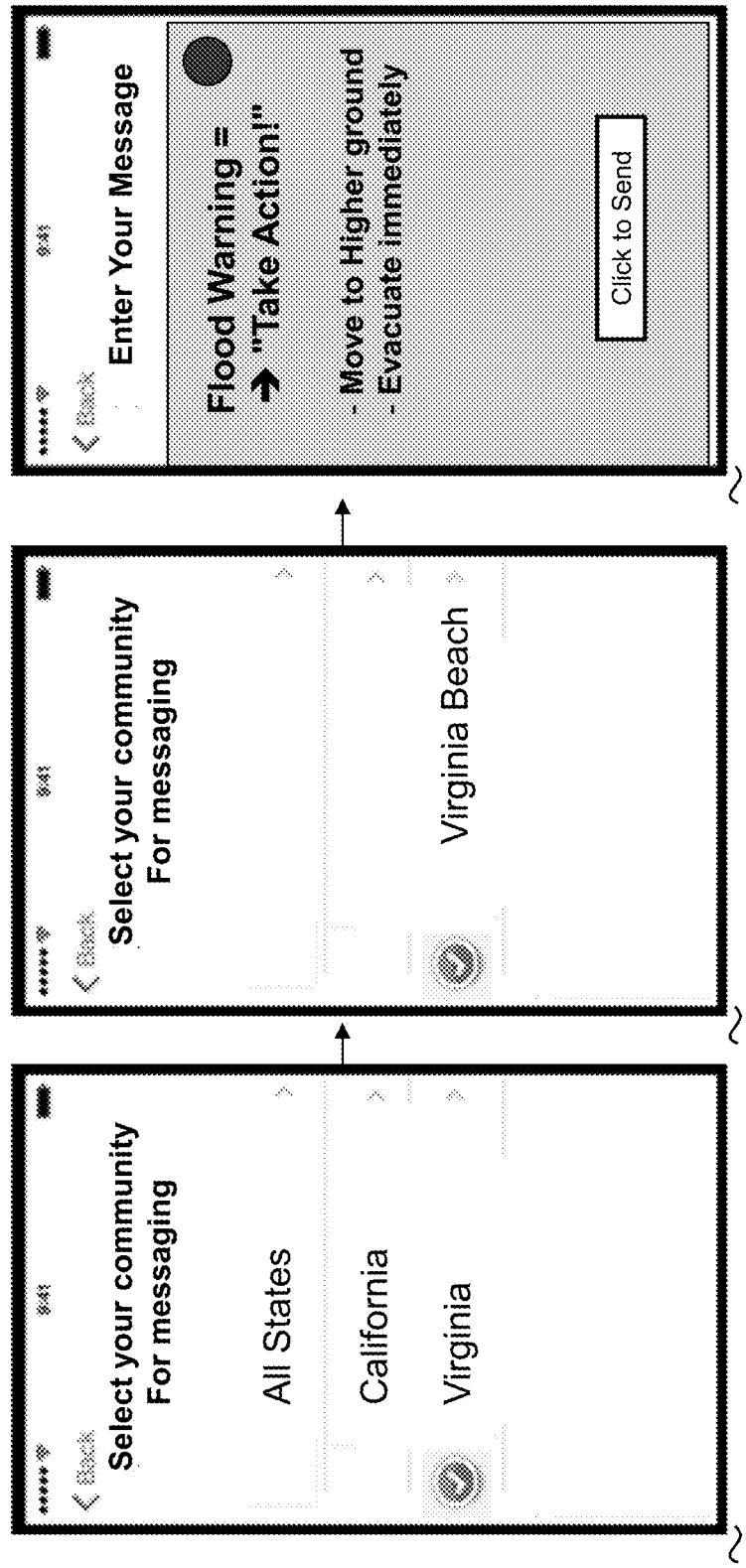

FIG. 5D shows how the Government can send emergency message. Sender member 10 (the Government) selects a community to message via a website, application or mobile App that interfaces with the CNS computer 30. Once the community (Va., Virginia Beach) is selected, message can be input by sender member 10. The emergency message is created and submitted to the CNS computer 30 for distribution to intended recipient member 20.

CNS computer 30 has many advantages. It allows people living or working in a community to always be well informed about news and activities within the community or in relation to the community.

Another advantage of CNS computer 30 allows businesses and government agencies to easily and quickly send messages to the people in a community. Currently businesses and government agencies abilities are limited.

Another advantage of CNS computer 30 allows a government agency to easily, quickly and accurately communicate alerts, warnings and/or other messages with people in a specific community. Currently government agencies abilities are limited.

Another advantage of CNS computer 30 is that it allows people living in a community to join the community hub and connect with all businesses in the community easily.

Another advantage of CNS computer 30 is that it allows employees of a company be always well informed about the company's news by joining a community within a company.

In general, the current state of the art lacks a system and method for community networking system and method where people receive messages related to the activities within a community or in relation to a community in real time. Without CNS computer 30, businesses and government agencies are disconnected from people living or working in a community. CNS computer 30 builds the connection between GOBs (Government agencies, Organizations and Businesses) and communities. CNS computer 30 removes "no connection no communication" barrier. To remove this barrier, the system allows GOBs to communicate electronic messages via community-hubs without requiring GOBs to have access to the contact information of the people who receive the message, and without requiring the people to follow thousands of GOBs via social networking sites.

The current state of the art lacks a system and method for Community Networking for connecting GOBs with people in a community. Without CNS computer 30, businesses and government agencies are disconnected from communities and therefore communication of messages with people is not easy.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention, which is set forth in the following claims.

Particular embodiments of the subject matter described in this specification can be implemented to realize many advantages of the messaging system. The system of the present invention is able to configure the community-hubs in hierarchical relationships (parent-, child-, grandchild-, and great grandchild relationship etc.). This configuration enables the system to define different authorization level to allow electronic messages to reach different communities. Also, when a user joins a community-hub as a recipient and the community-hub has one or more parents-hubs such as parent-, grandparent or great grandparent-community-hubs, the recipient may not only receive messages from the community-hub, the recipient may also receive messages from the one or more parents-hubs. The community-hub and the one or more parent-hubs may send electronic messages to the recipient, in response to a request received from the recipient via the recipient electronic device. For example, assuming that there are only three community-hubs: a grand parent community-hub G-hub, a parent community-hub P-hub, and a child community-hub C-hub, G-hub is the parent of P-hub and P-hub is the parent of C-hub (in other words P-hub and C-hub are sub-community-hubs of G-hub). Further, if the company SmithCorp is authorized to send electronic messages to G-hub and only company MaryCorp is authorized to send electronic messages to C-hub, SmithCorp's authorization level is higher than MaryCorp's authorization level. That is because G-hub's community hierarchy is higher than C-hub (G-hub is the grand parent of C-hub). In this example, the messaging system may authorize SmithCorp to send messages to the community-hub G-hub, and also may authorizes SmithCorp to send messages to all sub-community-hubs of G-hub (P-hub and/or to C-hub), while only authorizing MaryCorp to send messages to community-hub C-hub. When SmithCorp sends an electronic message to G-hub, the system may send that electronic message to the recipients of G-hub and to the recipients of sub-communities of G-hub (to the recipients of P-hub, and/or to the recipients of C-hub), however MaryCorp messages may only reach the recipients of C-hub. If the recipient Bob joins the community-hub C-hub, Bob may not only receive messages that were sent to C-hub. Bob may also receive all messages that were sent to the parent-communities of C-hub (P-hub and G-hub are parent communities of C-hub) (See also FIGS. 4A, 4B, 4C, and 8).

In another embodiment of the present disclosure, for faster and better performance of messaging, the messages of a community-hub could be kept in units (a unit contains multiple messages) at the community-hub and delivered in the form of one or more units to the recipients. For example, a unit could be for "today's deals". In another embodiment, the messaging system may have access to a timer. The messaging system may go through the messages of the community-hubs in regular or irregular intervals and may remove expired messages from the community-hubs or flag the messages as expired. And in another embodiment, to further improve performance only a short version of the messages such as titles may be kept in units and delivered to the recipients. The short version of a message may include information such as a link or a pointer to enable the recipients to request and/or retrieve a detailed version of the message from the messaging system or another system.

Figure 6:
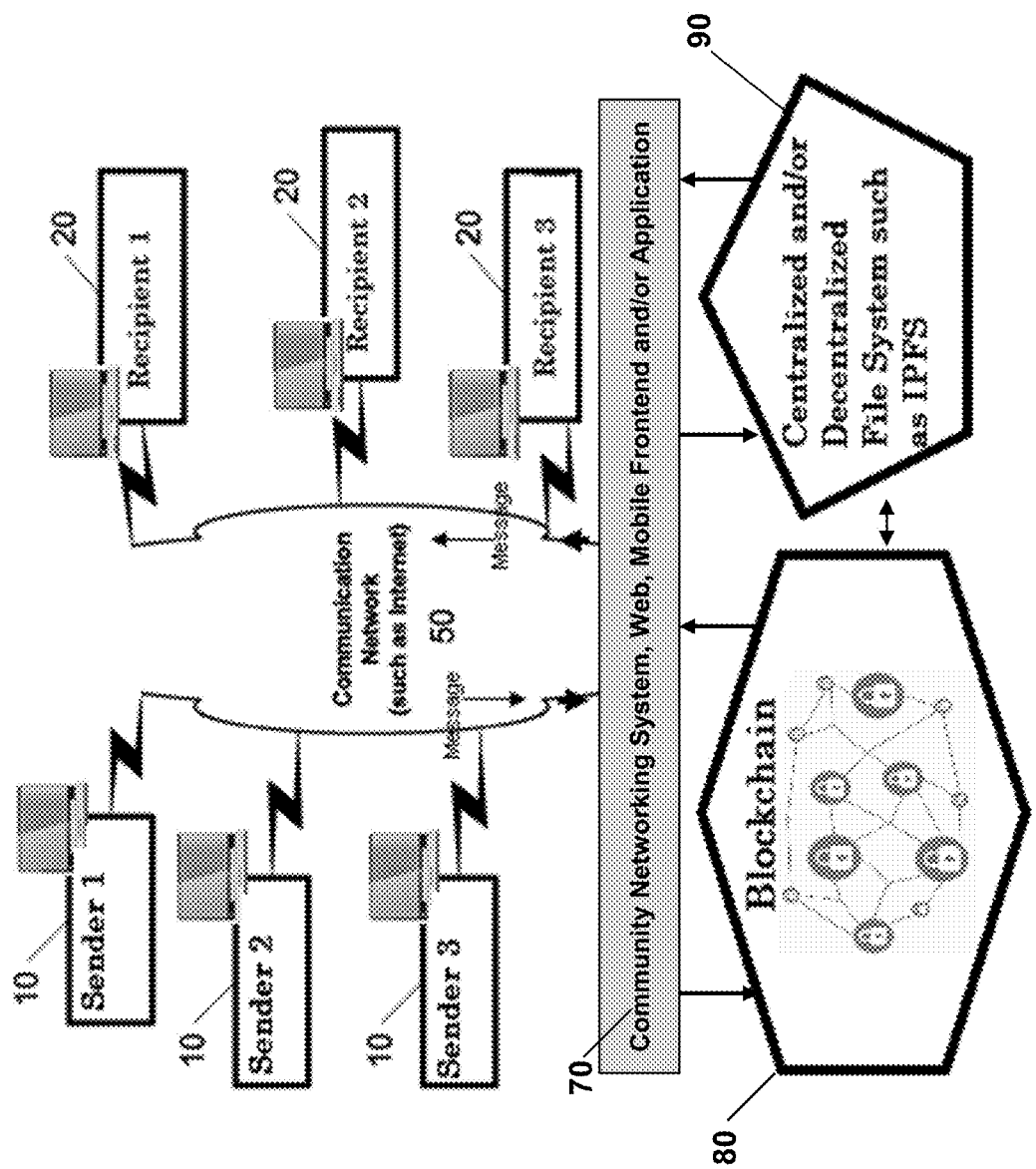
FIG. 6 shows an exemplary community networking system using a blockchain.
Figure 7:
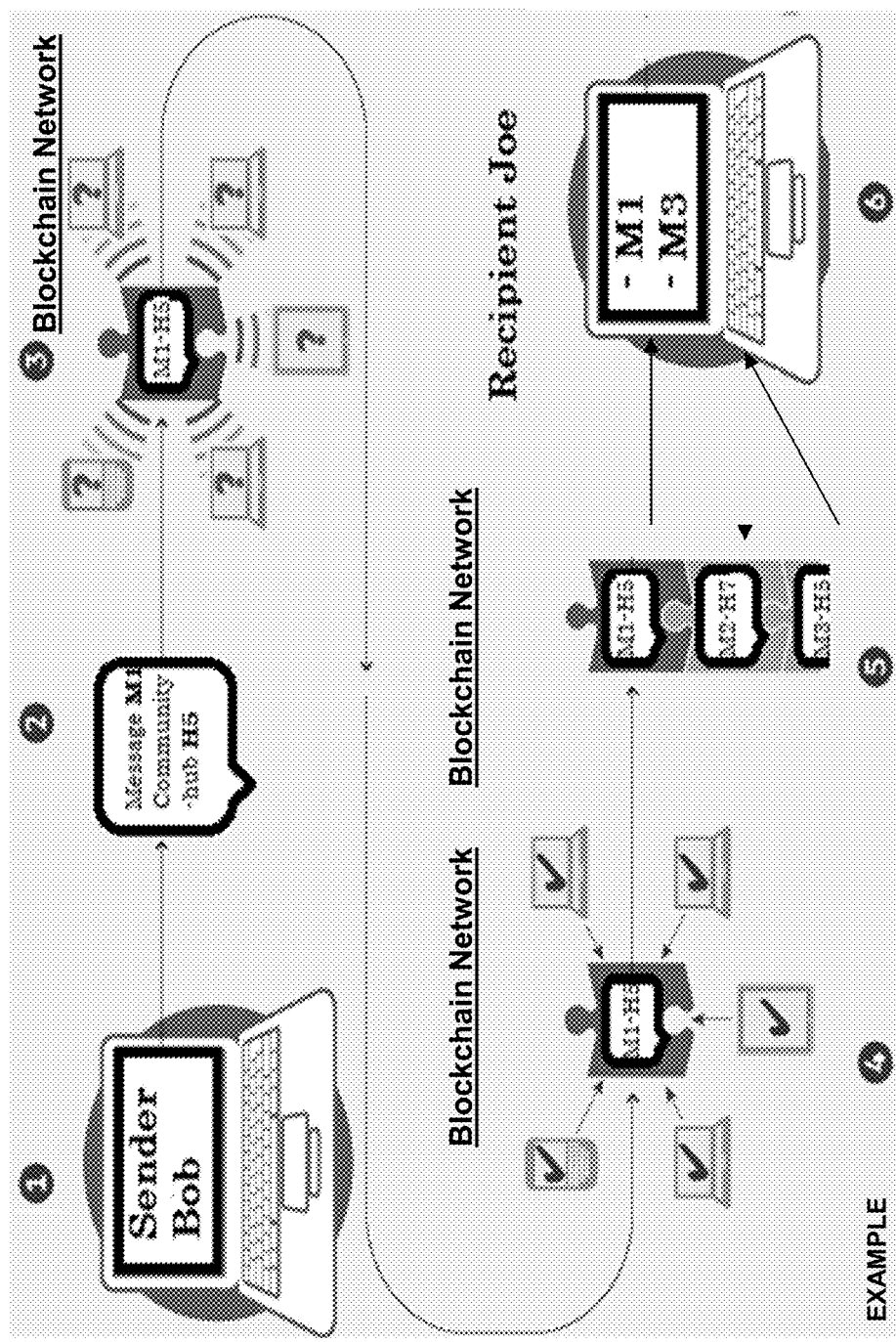
FIG. 7 shows an exemplary message flow from a sender member to a community-hub of blockchain and from the community-hub of blockchain to a recipient member.
Figure 8:
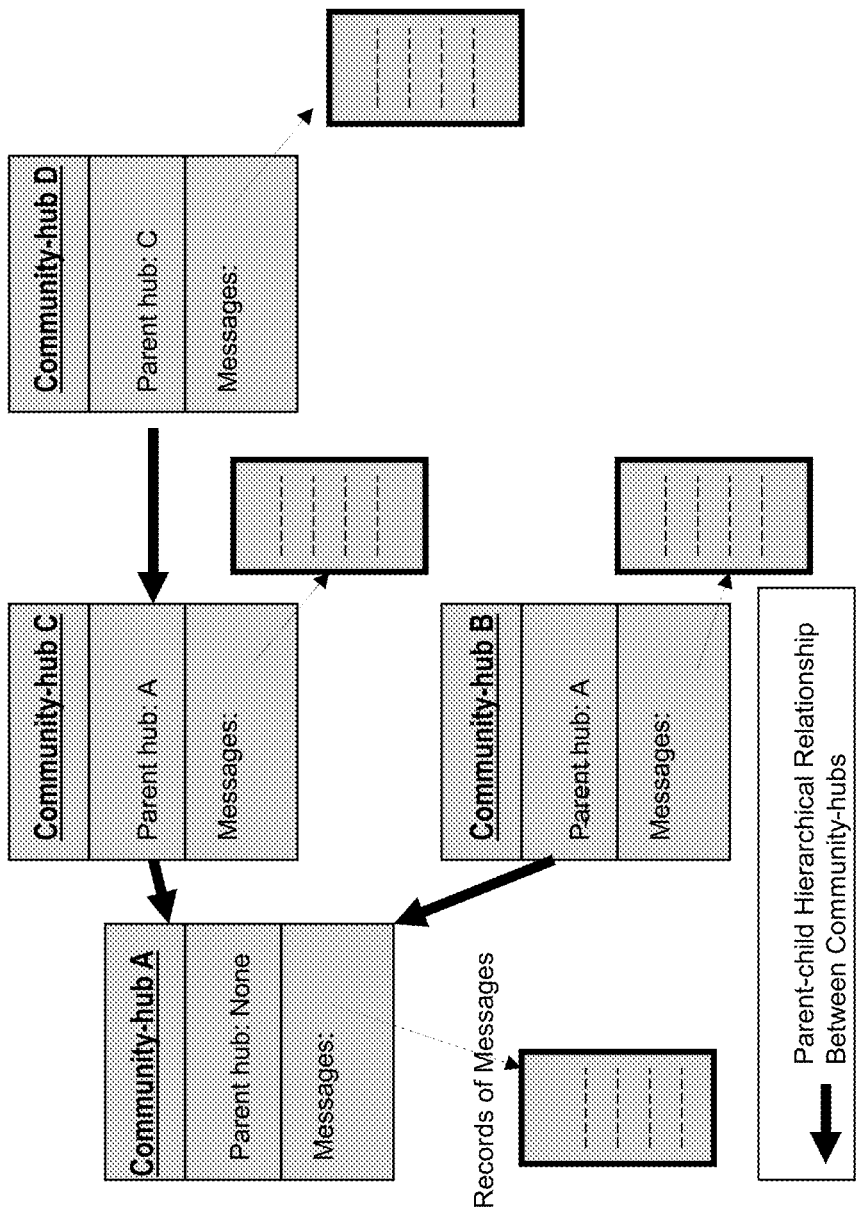
FIG. 8 shows exemplary community-hubs in hierarchical relationships where a community-hub has a name or identifier, it also has identifying information of parent community-hub and records of messages sent to the community-hub.

With reference to FIGS. 6 and 7, in order to improve performance and reduce the costs of maintaining the system, the entire Community Networking System (CNS) or any component of the CNS may be implemented using blockchain technology such as Ethereum and/or decentralized file system technology. A blockchain is a decentralized network, and/or a distributed blockchain computer system including multiple computing nodes, each computing nodes storing electronic messages, or a portion of the electronic messages. Blockchain computer system, records multiple electronic messages along with one or more community-hub indicators indicating respective community-hubs for the multiple electronic messages. The decentralized blockchain computer system may use distributed databases and/or distributed ledger technology that securely maintains records called blocks, which are linked using cryptography. The blocks can hold various information, such as transaction data and/or other information as desired.

FIG. 6 shows a block diagram of a networked computer environment for receiving, recording and providing electronic messages in a distributed and/or decentralized manner using one or more blockchains. A networked computer environment includes a distributed blockchain computer system 80 for storing one or more ledgers related to one or more community-hubs and/or one or more electronic messages, sender member 10 and recipient member 20 for accessing services using a CNS server, a CNS application, a web or mobile front end and/or decentralized applications (DApps) 70.

Blockchain 80 may provide a mechanism for sender member 10 to send an electronic (digital) message to one or more community hubs. Blockchain 80 may record the message into one or more blocks maintained by blockchain 80 and/or place the contents of the message in a decentralized file system 90. Blockchain 80 may receive and record an electronic message along with one or more community hub indicators indicating the selected community hubs the message is to be disseminated to. When an intended recipient member 20 of the indicated community hubs communicates with blockchain 80 using a CNS application 70, the intended recipient member 20 can retrieve messages from blockchain 80. Blockchain 80 may identify the intended recipient member 20 and also may identify the community hubs of the intended recipient member 20 for providing the messages of the identified community hubs to the intended recipient member 20. Blockchain 80 may also identify the parent hubs of the identified community-hubs and provide the messages of the parent hubs to the intended recipient member 20. The blocks of blockchain 80 may hold message data, sender identification data, recipient identification data, authorization data, community-hub data and/or other information as desired.

The sender member 10 and recipient member 20 may be various computing devices or various smart devices. The sender member 10 and recipient member 20 may use the CNS server, CNS application, web and/or mobile front end and/or decentralized applications (CNS application 70), for communication with blockchain 80 and/or decentralized file system 90 over a communication network. The sender member 10 may also be an external computer system such as computer system of a local news agency communicating with CNS server and/or Blockchain 80.

The entire tasks or processes of the community networking system, or any component of the system disclosed herein may be implemented through smart contracts on a blockchain 80. A smart contract is a script or computer program that runs on a blockchain and uses software code to perform or automate tasks In one example, a smart contract programmed and implemented on blockchain 80 may authenticate and identify sender member 10, check the sender's authorization, and if sender member 10 is authorized, receive and record the message. In another example, a smart contract on a blockchain 80 may be used to identify the intended recipient member 20 and/or to identify the community-hubs of the intended recipient and provide the messages of the identified community-hubs to the intended recipient member 20. The messages may be provided to the intended recipient member 20 after receiving the intended recipient's request. The smart contract on a blockchain 80 may allow the intended recipient member 20 to retrieve messages from the community hubs on a blockchain 80 as well. It is important to note that a decentralized storage system or decentralized file system 90 such as Swarm or IPFS may be used to store the contents or portion of the contents of the message.

The invention claimed is:

1. A blockchain-based community messaging system including a processor and a memory, the blockchain-based community messaging system comprising:
   a distributed blockchain computer system including a plurality of computing nodes and a plurality of community-hubs,
      wherein individual computing nodes of the plurality of computing nodes store electronic messages or a portion of the electronic messages, and
      wherein the distributed blockchain computer system is configured to perform operations comprising:
         receiving a first electronic message and at least one community-hub indicator via a network, wherein the at least one community-hub indicator indicates at least one community-hub of the plurality of community;
         storing the first electronic message or a portion of the first electronic message with the at least one community-hub indicator;
         in an electronic communication with a recipient of the at least one community-hub indicated by the at least one community-hub indicator, identifying the recipient, wherein the recipient is a user who subscribed to, or joined the at least one community-hub to receive the first electronic message; and
         providing the first electronic message or the portion of the first electronic message to the recipient,
   wherein:
      the plurality of community-hubs represent a respective plurality of physical communities, and
      the plurality of physical communities correspond to a respective plurality of geographic locations having preexisting physical relationships, and
      the plurality of physical communities comprise governmental divisions, the governmental divisions including cities, counties, and states, and wherein:
      the community messaging system maintains a hierarchy between the plurality of community-hubs mapped from the preexisting physical relationships between the plurality of physical communities, and
      the at least one community-hub is a parent or a child of at least a second community-hub of the plurality of community-hubs in the hierarchy.

2. The blockchain-based community messaging system of claim 1, wherein the distributed blockchain computer system provides the first electronic message to the recipient in response to a request received.

3. The blockchain-based community messaging system of claim 1 further performs operations comprising:
   determining that the hierarchy includes a third community hub that is a parent of the at least one community-hub; and
   providing the electronic messages of the community-hub as well as the electronic messages of the third community-hub to the recipient.

4. The blockchain-based community messaging system of claim 1, wherein the electronic messages are displayed on a recipient computing device, a recipient smart device or a recipient mobile phone.

5. A method to enhance electronic messaging within a community messaging system having a plurality of community-hubs, the method comprising:
   maintaining a mapping of the plurality of community-hubs to a plurality of physical communities, wherein:
      the plurality of community-hubs respectively represent the plurality of physical communities,
      the plurality of physical communities correspond to a respective plurality of geographic locations having preexisting physical relationships, and
      the plurality of geographic locations comprise governmental divisions, the governmental divisions including cities, counties, and states,
   maintaining membership information of the plurality of community-hubs, wherein the membership information identifies:
      a plurality of business-users subscribed to send electronic messages to one or more community-hubs of the plurality of community: hubs;
      a first business-user of the plurality of business-users subscribed to the community messaging system as a sender member to send electronic messages to at least one community-hub of the one or more community-hubs based on authorization by the community messaging system, wherein without authorization the first business-user is unable to send electronic messages to the at least one community-hub;
      one or more community-users of a plurality of community-users subscribed to receive the electronic messages from the at least one community-hub;
   receiving, by the at least one community-hub, a first electronic message from the first business-user;
   identifying the one or more community-users subscribed to receive the electronic messages from the at least one community-hub; and
   providing, by the at least one community-hub, the first electronic message to the one or more community-users,
   wherein sender members are users subscribed to the community messaging system to send electronic messages to the one or more community-hubs.

6. The method of claim 5 further comprising:
determining that the at least one community-hub has at least one sub-community-hub; and
providing the first electronic message to the one or more community-users subscribed to the at least one sub-community-hub.

7. The method of claim 5, further comprising:
providing the first electronic message in response to a request received.

8. The method of claim 5 further comprising:
retrieving the first electronic message or a portion of the first electronic message from a distributed blockchain computer system, wherein the distributed blockchain computer system includes multiple computing nodes, individual computing nodes of the multiple computing nodes storing the first electronic message or the portion of the first electronic message of the respective community-hub.

9. The method of claim 5, further comprising receiving a message response indicator, wherein the message response indicator includes at least one of:
an indication as to whether the first electronic message is one-way in which a response from the one or more community-users to the first business-user is not allowed, or two-way in which the one or more community-users are allowed to respond to the first electronic message and to discuss the first electronic message with the one or more community-users;
an indication that the one or more community-users are allowed to respond to the first electronic message, but not allowed to discuss the first electronic message with the other community-users of the plurality of community users;
an indication that the one or more community-users are allowed to discuss the first electronic message with the other community-users but not allowed to respond to the first electronic message;
an indication that the one or more community-users are allowed to see responses of the other community-users the recipients, but are not allowed to discuss the first electronic message with the other the one or more community-users; and
an indication that the response from the one or more community-users are visible only to the first business-user but not visible to the other community-users.

10. The method of claim 5, the first electronic message comprises one or more multimedia or digital contents, including one or more of the following: text, an image, a digital photo, digital video, digital audio, and digital files.

11. The method of claim 5, the first electronic message expires after a predefined time.

12. The method of claim 5, the first electronic message includes a link or a pointer enabling the one or more community-users to request or retrieve a detailed version of the first electronic message.

13. A community messaging system having a plurality of community-hubs, the system comprising:
a memory device and a processor, wherein the memory device stores program instructions that, when executed by the processor, cause the processor to:
maintaining a mapping of the plurality of community-hubs to a plurality of physical communities, wherein:
the plurality of community-hubs respectively represent the plurality of physical communities,
the plurality of physical communities correspond to a respective plurality of geographic locations having preexisting physical relationships, and
the plurality of geographic locations comprise governmental divisions, the governmental divisions including cities, counties, and states,
maintaining membership information of the plurality of community-hubs, wherein the membership information identifies:
a plurality of business-users subscribed to send electronic messages to one or more community-hubs of the plurality of community-hubs,
a first business-user of the plurality of business-users subscribed to the community messaging system as a sender member to send electronic messages to at least one community-hub of the one or more community-hubs based on authorization by the community messaging system, wherein without authorization the first business-user is unable to send electronic messages to the at least one community-hub; and
one or more community-users of a plurality of community-users subscribed to receive the electronic messages from the at least one community-hub;
receive, by the at least one community-hub, a first electronic message from the first business-user;
identify one or more community-users subscribed to receive the electronic messages from the at least one community-hub; and
provide, by the at least one community: hub, the first electronic message to the one or more community-users,
wherein sender members are users subscribed to the community messaging system to send electronic messages to the one or more community-hubs.

14. The community messaging system of claim 13, wherein the program instructions further cause the processor to:
determine that the at least one community-hub has at least one sub-community-hub; and
provide the first electronic message to the one or more community-users subscribed to the at least one sub-community-hub.

15. The community messaging system of claim 13, wherein the program instructions further cause the processor to:
provide the first electronic message in response to a request received.

16. The community messaging system of claim 13, wherein the program instructions further cause the processor to:
retrieve the first electronic message or a portion of the first electronic message from a distributed blockchain computer system, wherein the distributed blockchain computer system includes multiple computing nodes, individual computing nodes of the multiple computing nodes storing the first electronic message or the portion of the first electronic message of the respective community-hub.

17. The community messaging system of claim 13, wherein the program instructions further cause the processor to:
receive a message response indicator, wherein the message response indicator includes at least one of:
an indication as to whether the first electronic message is one-way in which a response from the one or more community-users to the first business-user is not allowed, or two-way in which the one or more community-users are allowed to respond to the first electronic message and to discuss the first electronic message with other community-users of the plurality of community users;

an indication that the one or more community-users are allowed to respond to the first electronic message, but not allowed to discuss the first electronic message with the other community-users;

an indication that the one or more community-users are allowed to discuss the first electronic message with the other community-users but not allowed to respond to the first electronic message;

an indication that the one or more community-users are allowed to see responses of the other community-users, but are not allowed to discuss the first electronic message with the other community-users; and an indication that the response from the one or more community-users are visible only to the first business-user but not visible to the other community-users.

18. The community messaging system of claim 13, wherein the program instructions further cause the processor to:

keep the first electronic message in a unit including multiple electronic messages at the at least one community-hub and the unit is delivered to the one or more community-users.

19. The community messaging system of claim 13, the first electronic message expires after a predefined time.

20. The community messaging system of claim 13, the first electronic message includes a link or a pointer enabling the one or more community-users to request or retrieve a detailed version of the first electronic message.

21. The method of claim 5, wherein the first electronic message comprising news, deals, offers or other information.

22. The method of claim 5, wherein the one or more community-users subscribed to the at least one community-hub to electronically receive messages, news, deals, offers or other information from the plurality of business-users via the at least one community-hub.

23. The method of claim 5, wherein the authorization by the community messaging system comprises the community messaging system allowing the electronic messages to be sent to the at least one community-hub.

24. The community messaging system of claim 13, wherein the first electronic message comprising news, deals, offers or other information.

25. The community messaging system of claim 13, wherein the one or more community-users subscribed to the at least one community-hub to electronically receive messages, news, deals, offers or other information from the plurality of business-users via the at least one community-hub.

26. The community messaging system of claim 13, wherein the authorization by the community messaging system comprises the community messaging system allowing the electronic messages to be sent to the at least one community-hub.

* * * * *